3,599,115

[72] Inventor Dale L. Beezley
P. O. Box 41, Los Altos, Calif. 94022
[21] Appl. No. 743,146
[22] Filed July 8, 1968
[45] Patented Aug. 10, 1971

[54] LASER SEQUENCING
1 Claim, 3 Drawing Figs.
[52] U.S. Cl. .................................................. 331/94.5, 350/96
[51] Int. Cl. .................................................. H01s 3/02
[50] Field of Search ........................................ 331/94.5; 350/96

[56] References Cited
UNITED STATES PATENTS
| | | | |
|---|---|---|---|
| 3,115,076 | 12/1963 | Levene | 355/1 |
| 3,240,106 | 3/1966 | Hicks | 350/7 |
| 3,310,753 | 3/1967 | Burkhalter | 331/94.5 |
| 3,311,844 | 3/1967 | DiCurcio | 331/94.5 |
| 3,434,073 | 3/1969 | Forkner | 331/94.5 |

*Primary Examiner*—Ronald L. Wibert
*Assistant Examiner*—Edward Bauer

ABSTRACT: The present invention relates to the time sequencing of laser high energy pulses from a single lasing source into a multiplicity of laser actuated functions. In the embodiment of the invention disclosed, the time sequencing is achieved by the synchronized triggering of the laser source into a continuously rotating fiber optic light guide that sweeps past a manifold of stator light guides leading to the multiplicity of laser actuated functions. The coincidence of the rotating light guide's axis with the axis of a particular stator light guide's axis concurrently with the condition of a light shutter, between the stator and a particular laser actuated function, being open, results in a low-level trigger light from the rotor energizing the trigger circuits of the laser source, this action occurring so rapidly that the laser source lases into the fiber optics, passing higher level laser energy into the laser actuated function designated by the shutter actuation. Thus is achieved any sequencing pattern desired without the acceleration-deceleration forces (hence, unreliability) in a stepping motor, while achieving perfect synchronization and alignment of the rotor light guide with the stator light guides.

INVENTOR
Dale L. Beezley
Dale L. Beezley

LASER SEQUENCING

The sequencing of high energy laser pulses of kilowatt and megawatt levels generated by one laser head requires close attention to materials utilized in the shutter mechanisms, since most materials deteriorate rapidly when exposed repeatedly to such concentrated power levels. Furthermore, delicate mechanisms such as electro-optic or acousto-optic modulators cannot be utilized since they are extremely sensitive to temperature and therefore cannot effect reliable sequencing of high-power, heat generating laser energy pulses.

It has been found that megawatt pulses may be conducted through fiber optic light guides repeatedly without appreciable deterioration after many sequencing operations. In addition, a considerable portion of the original energy level may be directed through the fibers for a distance of many feet with maintenance of energy sufficient to perform many laser-actuated functions. Such functions are: the initiation of ordnance booster charges for rocket motor starting or separation events on multistage rockets; welding of leads in the manufacture of semiconductor devices; initiation of booster charges for blasting in construction or excavation operations.

Heretofore, in order to overcome the sequencing difficulty, stepping motors have been utilized, whereby solenoid-driven ratchets released a spring-loaded or motor driven rotor to allow the fiber-optical output of a laser to be directed into various fiber receptor optics on the stator, thereby achieving a sequencing of laser output energy into the various receptor fibers, and thence into the various laser actuated functions. It has been found, however, that the stepping devices are inherently unreliable, due to the high acceleration-deceleration forces exerted for stepping, or sequencing, at any appreciable speed. High failure rate of the sequencing mechanism is thus unavoidable, making sequenced laser energy an unacceptable mode of function actuation for very complex systems. In addition, alignment of the rotor light guide with the stator light guides becomes an appreciable mechanical design problem.

The present invention provides means for overcoming the foregoing difficulties. More particularly, the present invention provides a continuously rotating motor driven rotor means with negligible acceleration-deceleration forces, a low level trigger light means in conjunction with shutter means for achieving triggering of the laser at the instant of alignment of the rotor light guide with stator light guide, to effect automatic alignment and properly synchronized sequencing from one function to the next.

These and other features and advantages of the present invention will become readily apparent from the following detailed description of a single embodiment thereof, particularly when taken in connection with the accompanying drawings wherein like reference numerals refer to like parts and wherein.

Figure 1:
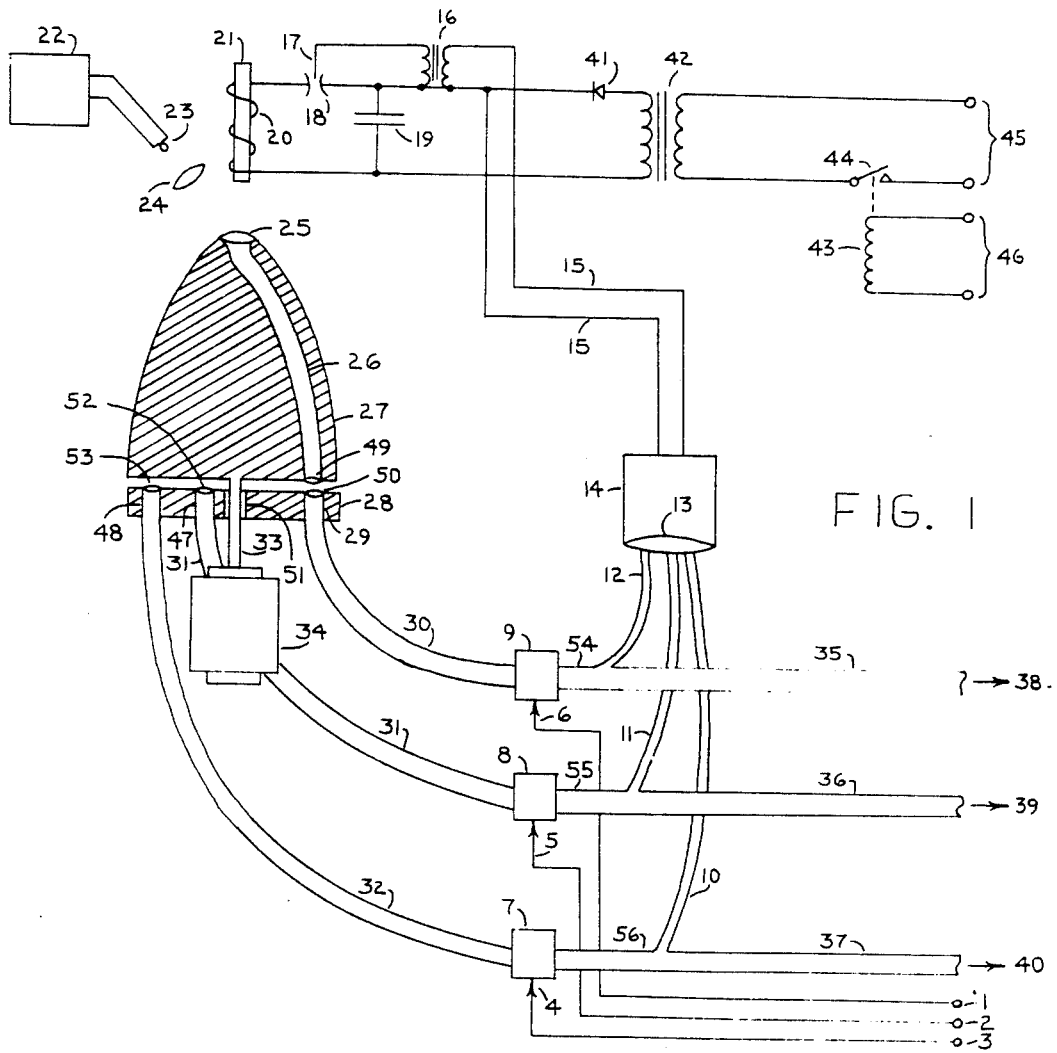
FIG. 1 is a cross-sectional view of the rotor and stator combined with schematic representations of associated circuitry and fiber light guides.

Referring to the drawings in more detail, the present invention is particularly adapted to be embodied in means for rotating the rotor 27 by a motor 34 through a coupling shaft 33 extending through a hole 51 in said stator 28. The speed of said motor is not critical, as will be shown; indeed, the speed may vary over wide ranges, even during the sequencing operation, since alignment and synchronization are automatic. In this embodiment of the invention, only three laser actuated functions are indicated, 38, 39, and 40, representing booster charges illuminated and actuated by laser energy via light guides 35, 36, and 37 respectively. Electrical control signals 1, 2, and 3, applied to the actuation terminals 6, 5, and 4, respectively, of light shutters 9, 8, and 7 respectively, determine which of functions 38, 39, and 40 respectively shall be actuated. It is to be understood that this embodiment of the invention, though demonstrating the operation of a 3-function sequencer, is not limited to 3 function, but in fact may have as many functions as may be fitted light guides onto the periphery of the stator 28, which may be as large as required.

To follow a typical sequence through its complete cycle, observe that the power source 22 provides continuous energy to trigger light source 23, a neon or incandescent light, which illuminates the trigger lens 24, which focuses this low level light energy from said light source onto the rotor lens 25. From said rotor lens the trigger light energy passes into a fiber optic light guide 26 encapsulated in the opaque rotor 27. Said trigger light energy emerges from said rotor through the rotor light guide output lens 49, illuminating the opposite face of the stator 28. Inasmuch as the rotor 27 is rotating at an angular rate of from 200 r.p.m. to 1800 r.p.m. or faster, being driven by the motor 34 through the shaft 33, there occur, per revolution, three instances of alignment of the rotor light guide 26, namely with stator light guides 29, 47, and 48.

Figure 2:
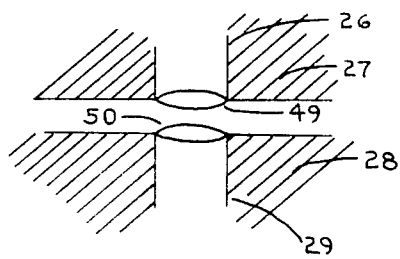
FIG. 2 is a fragmentary cross-sectional view of the portion of the stator and rotor in the vicinity of the rotor light guide output optics and stator light guide receptor optics.
Figure 3:
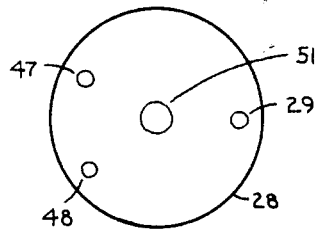
FIG. 3 is an end view of the stator, with motor shaft omitted.

One instant of alignment is exemplified in FIG. 2, where a view is shown of rotor light guide 26 aligning with stator light guide 29. The trigger light energy aforementioned, emerging from rotor light guide output lens 49 and entering stator light guide receptor lens 50, progresses into the stator light guide 29 and thence into the stator output light guide 30. Each stator light guide 29, 47, and 48 has a stator light guide receptor, 50, 52, and 53 respectively, through which light passes when alignment occurs with the rotor light guide 26. From the stator light guides 29, 47, and 48, trigger light passes to the stator output light guides 30, 31, and 32 respectively. Said stator output light guides terminate in shutters 9, 8, and 7 respectively. Said shutters are electronically actuated, or opened, by application of electrical signals to actuation terminals 6, 5, and 4 respectively, from electrical signal sources 1, 2, and 3 respectively.

If, for instance, the detonation of booster charge represented by function 38 is the next desired step of a sequence, electrical signal 1 would be applied to actuation terminal 6 of shutter 9, allowing the aforementioned trigger light to pass through said shutter the next time alignment of light guide 26 occurs with light guide 29.

The emergence of trigger light from shutter 9 into light guide 54 and thence into light guide 12 and into the laser trigger generator lens 13 results in laser trigger generator 14 converting, by standard means, the light energy into a pulse of electrical energy on electrical lines 15, which are represented schematically. Transformer 16 steps up the low pulse voltage on lines 15 to a high voltage level sufficient to trigger the triggered gap switch 18 via trigger probe 17. Capacitor 19, being precharged via devices 41, 42, 43, 44, 45, and 46, to a high voltage level capable of being sustained by gap switch 18, discharges, upon receipt of said high voltage trigger on probe 17, into Xenon flash tube 20. This action produces the pumping energy necessary to cause laser device 21 to emit high power coherent light energy into the rotor lens 25.

The sequence of events from initial alignment of light guide 26 with light guide 29 to the emission of a giant pulse of energy from laser 21 occurs so rapidly that the said light guides have not appreciably changed their degree of alignment when the megawatt laser pulse emerges from the rotor output lens 49 (typically 1 millisecond). Consequently, the laser pulse travels through the open shutter 9, into light guide 54, thence into light guide 35, and finally into the booster charge 38, causing said booster charge to explode, or function. Before a complete revolution of the rotor occurs, the actuation electrical signal 1 1 removed from actuation terminal 6, closing shutter 9.

Similarly, at some time later, when it is desired to function booster charge 39, electrical signal 2 is applied to actuation terminal 5 of shutter 8, causing said shutter to open, allowing aforementioned trigger light energy to pass through said shutter when, in the course of 1 cycle of a complete revolution of rotor 27, light guide 26 aligns with light guide 47. Trigger light energy then passes into light guides 31, 55, and 11 and causes laser triggering as heretofore described. In this case laser energy would pass through open shutter 8, light guides 55 and 36, and thence into booster charge 39. Within 1 cycle of 1 revolution of rotor 27, the electrical signal 2 would be removed from actuation terminal 5, closing shutter 8.

Once again, at some later time, when it is desired to function booster charge 40, electrical signal 3 is applied to actuation terminal 4 of shutter 7, causing said shutter to open, allowing aforementioned trigger light energy to pass through said shutter when, 1 the course of one cycle of a complete revolution of rotor 27, light guide 26 aligns with light guide 48. Trigger light energy then passes into light guides 32, 56, and 10 and causes laser triggering as heretofore described. In this case laser energy originating from laser device 21, would pass through open shutter 7, light guides 56 and 37, and thence into booster charge 40. Within 1 cycle of 1 revolution of rotor 27, the electrical signal 3 would be removed from actuation terminal 4, closing shutter 7.

It is apparent that a multiplicity of stator receptor light guides feeding a multiplicity of shutters and thence a multiplicity of booster charges far in excess of the 3 shown would be feasible, being limited only by the size of the stator. Evident, also, is the possibility of sequencing these booster charges in any desired pattern in time, limited only by the number of permutations of possible order and time of electrical signals at terminals 1, 2, 3,...,etc.

As mentioned already in the description, capacitor 19 is required to charge to a high voltage. The source of this charge is via an alternating current signal 45 passing through relay contacts 44 upon energizing relay coil 43 with DC electrical signal 46. The said AC signal is stepped up through transformer 42 and rectified by diode 41. This is a standard means of deriving high voltage from low voltage.

I claim:

1. A high power laser sequencer, including the combination of
   a continuously rotating rotor means directing a low level trigger light via a light guide to a multiplicity of stator light guides,
   a multiplicity of individually electronically actuated light shutter means, one for each stator light guide and connected thereto,
   an output light guide from each said shutter to each laser actuated function,
   a branch light guide from each output light guide, all said branches terminating in a pulse light to pulse voltage converter means, termed a laser trigger generator,
   a high voltage charging means for charging an energy storage capacitor means,
   a triggered high voltage gap means for switching the capacitor charge into a Xenon flash lamp upon receipt of the pulse voltage from said laser trigger generator means,
   a lasing means, which, upon receipt of flash lamp energy produces high energy coherent light, termed laser energy,
   focusing means, for directing said laser energy into aforementioned light guide in aforementioned rotor means.